United States Patent [19]

Sato

[11] Patent Number: 5,566,147
[45] Date of Patent: Oct. 15, 1996

[54] MAGNETO-OPTICAL RECORDING APPARATUS AND METHOD FOR MODULATING THE STRENGTH OF A GENERATED MAGNETIC FIELD INTO THREE LEVELS

[75] Inventor: Hideaki Sato, Yokohama, Japan

[73] Assignee: Canon Kabushiki Kaisha, Tokyo, Japan

[21] Appl. No.: 377,686

[22] Filed: Jan. 25, 1995

Related U.S. Application Data

[63] Continuation of Ser. No. 641,905, Jan. 16, 1991, abandoned.

[30]     Foreign Application Priority Data

Jan. 18, 1990   [JP]   Japan .................................. 2-007244

[51] Int. Cl.⁶ ............................................. G11B 13/04
[52] U.S. Cl. ............................................. 369/13
[58] Field of Search ........................... 369/110, 13, 59, 369/44.11, 126; 360/59, 114

[56]           References Cited

U.S. PATENT DOCUMENTS

| | | | |
|---|---|---|---|
| 4,670,865 | 6/1987 | Hatano | 369/13 |
| 4,748,605 | 5/1988 | Sakai et al. | 369/13 |
| 4,906,874 | 3/1990 | Fuji et al. | 369/13 |
| 4,907,211 | 3/1990 | Horimai et al. | 369/13 |
| 4,937,802 | 6/1990 | Omaii et al. | 360/114 |
| 4,979,158 | 12/1990 | Yoda | 369/13 |
| 5,091,897 | 2/1992 | Otokawa et al. | 360/59 |
| 5,126,985 | 6/1992 | Spruit et al. | 360/59 |
| 5,157,641 | 10/1992 | Lehureau | 360/59 |
| 5,163,031 | 11/1992 | Osato | 369/13 |

FOREIGN PATENT DOCUMENTS

| | | | |
|---|---|---|---|
| 304298 | 2/1989 | European Pat. Off. | 369/13 |
| 57-94906 | 6/1982 | Japan | 369/13 |
| 59-48803 | 3/1984 | Japan | 369/13 |
| 61-276103 | 12/1986 | Japan | 369/13 |
| 1-251454 | 10/1989 | Japan | 369/13 |
| 1-296405 | 11/1989 | Japan | 369/13 |
| 9015409 | 12/1990 | WIPO | 360/59 |

OTHER PUBLICATIONS

Oda, et al., "Process of Magnetization Reversal in a Spot Heated by Pulsed Laser Beam," Japan Appl. Magnetics Journ., vol. 10, No. 2, pp. 195–198, 1986.

Primary Examiner—Nabil Z. Hindi
Attorney, Agent, or Firm—Fitzpatrick, Cella, Harper & Scinto

[57]              ABSTRACT

A magneto-optical recording apparatus and method using a magnetic field modulation for forming a magnetic domain on a magneto-optical record medium by applying an external magnetic field which is modulated by record data, while applying a light beam spot which is fixed with respect to the direction of a data track on the magneto-optical record medium. The recording apparatus includes a magnetic field generation device for forming a pit, and a magnetic field strength control device for controlling the strength of an external magnetic field caused by the magnetic field generation device, by classifying it into three values depending on the record data.

3 Claims, 3 Drawing Sheets

APPLICATION DIRECTION OF EXTERNAL MAGNETIC FIELD

REPRESENTS ONE MAGNETIC DOMAIN

POLARIZATION DIRECTION OF REPRODUCING LASER BEAM

POLARIZATION DIRECTION OF REFLECTED BEAM (KERR EFFECT)

MAGNETO-OPTICAL RECORDING APPARATUS AND METHOD FOR MODULATING THE STRENGTH OF A GENERATED MAGNETIC FIELD INTO THREE LEVELS

This application is a continuation of prior application, Ser. No. 07/641,905 filed Jan. 16, 1991, now abandoned.

BACKGROUND OF THE INVENTION

1. Field of the Invention

The present invention relates to a magneto-optical recording apparatus and method in which data are recorded onto a magneto-optical record medium using the interaction between optical and magnetic effects.

2. Related Background Art

A magneto-optical disk used as a magneto-optical record medium attracts a good deal of attention because of a large recording capacity and an erasable-rewritable capability. However, a large area of data, such as image data, requires a larger recording capacity, but there are limitations in reducing a track width due to the accuracy and access speed of the device. An ordinary magnetic recording apparatus makes use of multi-value recording to realize a higher density of recording, while the magneto-optical recording apparatus still utilizes two-value recording of making a record depending on the magnetizing direction on a magnetic domain.

A conventional magneto-optical recording apparatus, which only uses a positive or negative finite value as the strength of an external magnetic field, records by switching the magnetizing direction on the basis of data, at the required clock timing, while the speed of a magneto-optical record medium, e.g. a magneto-optical disk, relative to a magneto-optical head is kept constant. The magneto-optical head applies a light beam of fixed strength onto an area of the magneto-optical disk where the external magnetic field is applied.

SUMMARY OF THE INVENTION

In view of the foregoing, it is an object of the present invention to provide a magneto-optical recording apparatus and method in which a higher recording density is realized so as to increase the recording capacity almost twice as much as previously used.

Thus, this invention is accomplished by providing a magneto-optical recording apparatus subjected to a magnetic field modulation method, for forming a magnetic domain by applying an external magnetic field which is modulated by record data, while applying a light beam spot which is fixed with respect to the direction of a data track on a magneto-optical record medium, comprising means for generating a magnetic field for forming a pit and means for controlling the strength of the external magnetic field generated by said magnetic field generation means, by classifying it into three values during recording.

DESCRIPTION OF THE PREFERRED EMBODIMENTS

Figure 1:
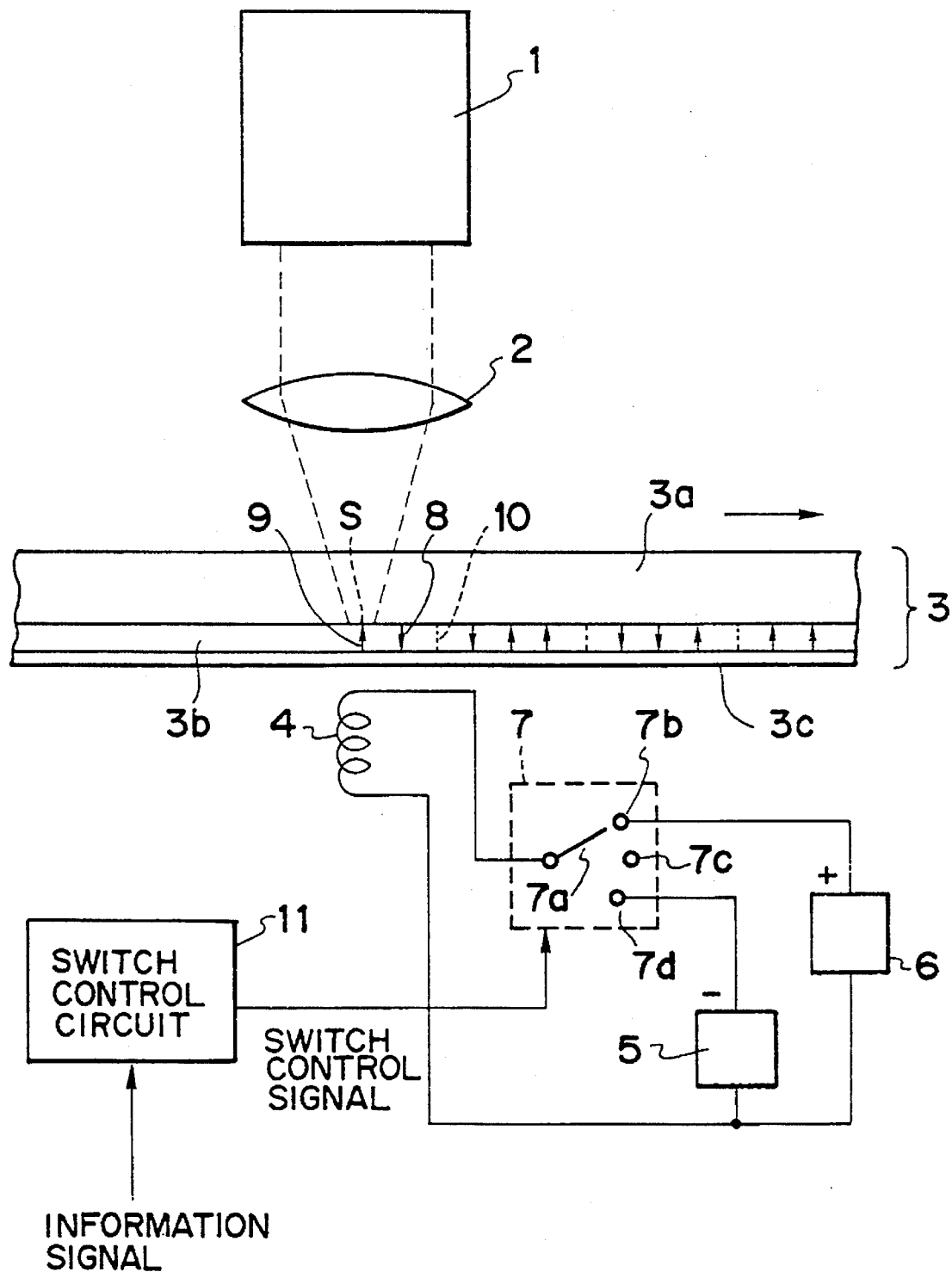
FIG. 1 is a view of a magneto-optical recording apparatus according to a first embodiment of this invention.

One embodiment of this invention will be specifically described with reference to FIG. 1. Reference numeral 1 is an optical system comprising a semiconductor laser and a collimator lens, which finally converges a light beam via an objective lens 2 onto a magneto-optical record medium, e.g., a magneto-optical disk 3, to form a light beam spot S. The magneto-optical disk 3 as described above is made by forming a recording layer 3b of a magnetic thin film on a transparent substrate 3a and then coating it with a protective layer 3c, while the other face on the opposite side is opposed to an electromagnetic coil 4 that constitutes means for controlling generating a magnetic field. The electromagnetic coil 4 has its one end connected to each one of terminals of negative power supply 5 and positive power supply 6, and the other end connected to a movable contact point 7a of 3-selection change-over switch 7 that constitutes control means for controlling the strength of the external magnetic field. The change-over switch 7 as above described comprises three fixed contact points, 7b, 7c and 7d, in which the fixed contact points 7b and 7d are connected to the other terminals of positive power supply 6 and negative power supply 5, respectively. And its change-over switching operation is controlled by means of a switch control circuit 11. The switch control circuit 11 controls the operation of the change-over switch 7 depending on record data.

In such a configuration, when the magneto-optical disk 3 rotates at a constant rate, opposed to the magneto-optical recording head (which holds the objective lens 2 in the optical system, and the electromagnetic coil 4 in the magnetic modulation control system), the change-over switch 7 as above described performs the change-over operation corresponding to a control signal given from the switch control circuit 11, to connect the movable contact point 7a to the fixed contact point 7b for a positive finite current value, e.g. +E, to the fixed contact point 7d for a negative finite current value, e.g. −E, or to the fixed contact point 7c for a zero current value. Though the change-over switch 7 as above described is in practice not a mechanical switch, but non-contact switch means (semiconductor switch) which can be switched by the voltage or current control, based on data, at the clock timing, a mechanical construction is shown in the drawings for the convenience of explanation. As a result, the magneto-optical disk 3 can accomplish the magnetic recording, for example, a downward magnetization (indicated by numeral 8), an upward magnetization (indicated by numeral 9), or a non-magnetization (indicated by numeral 10), for a magnetic domain on a track specified by the light beam spot S.

Figure 2A:
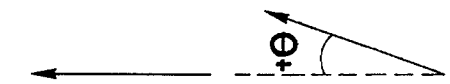
FIGS. 2A to 2C are views illustrating the principle for reproducing a record according to this invention.
Figure 2A:
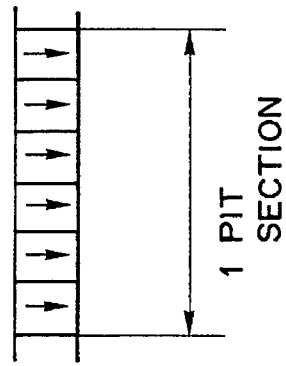
Figure 2A:
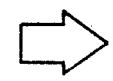
Figure 2B:
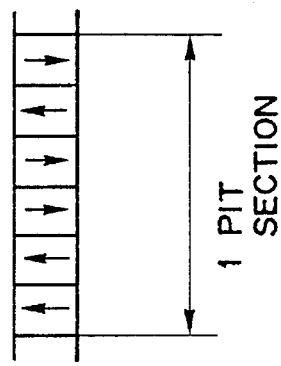
Figure 2B:
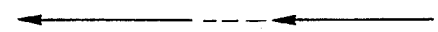
Figure 2C:
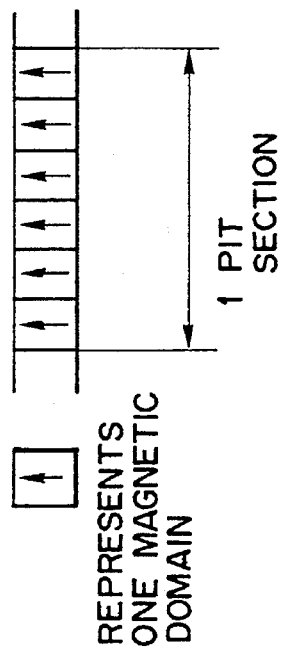
Figure 2C:
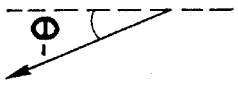

Reference will now be made to FIGS. 2A to 2C to describe the above construction in more detail. An area indicated by a one pit section in FIGS. 2A to 2C is a magnetic domain on a track specified by the light beam spot S. This magnetic domain is constructed of a plurality of small magnetic domains. First, if the external magnetic field is applied upwardly (here assumed as the positive direction) while the light beam spot is being applied into such a one pit section at a constant strength, the minute magnetic domains within the one pit section are all magnetized upwardly after passing through the irradiation position with the light beam spot. If the laser beam is applied into such a magnetic domain, the reflected beam is deviated by an angle −θ in the polarization direction of the applied laser beam due the Kerr effect (this deviation is referred to as a Kerr rotation, and θ as a Kerr rotation angle).

Next, if the external magnetic field is not applied with the light beam spot being applied into the one pit section at a constant strength, the minute magnetic domains within the one pit section are placed in a state where positively or negatively directed minute magnetic domains are mixed, after passing through the irradiation position with the light beam spot. The fact that such a magnetic domain exists is made public by Jin Oda, Takeo Ono and Masaaki Matsushima, Canon Inc., Central Institute, in "Process of Magnetization Reversal in a Spot Heated by Pulsed Lased Beam", Japan Applied Magnetics Journal, Vol. 10, No. 2, p. 195, 1986. If the laser beam is applied onto such a magnetic domain, the reflected beam would be deviated under the influence of the Kerr effect, but in this case, the apparent Kerr rotation angle becomes zero because the contributions from the positive and negative magnetic domains are offset by each other.

Next, if the external magnetic field is applied downwardly (here assumed to be the negative direction) with the light beam spot being applied into the one pit section at a constant strength, the minute magnetic domains within the one pit section are all magnetized downwardly after passing through the irradiation position with the light beam spot. If the laser beam is applied into such a magnetic domain, tile reflected beam is deviated by an angle $+\theta$ to in the polarization direction of the applied laser beam under the influence of the Kerr effect.

As described above, three types of states are possible for a magnetic domain on a record medium by controlling the strength of the external magnetic field in three states of positive finite value, negative finite value and zero. As the three types of states for the magnetic domain will show different Kerr effects in reproducing a record, they can be distinguished to provide a detection signal, so that the three-value recording can be enabled.

Figure 3:
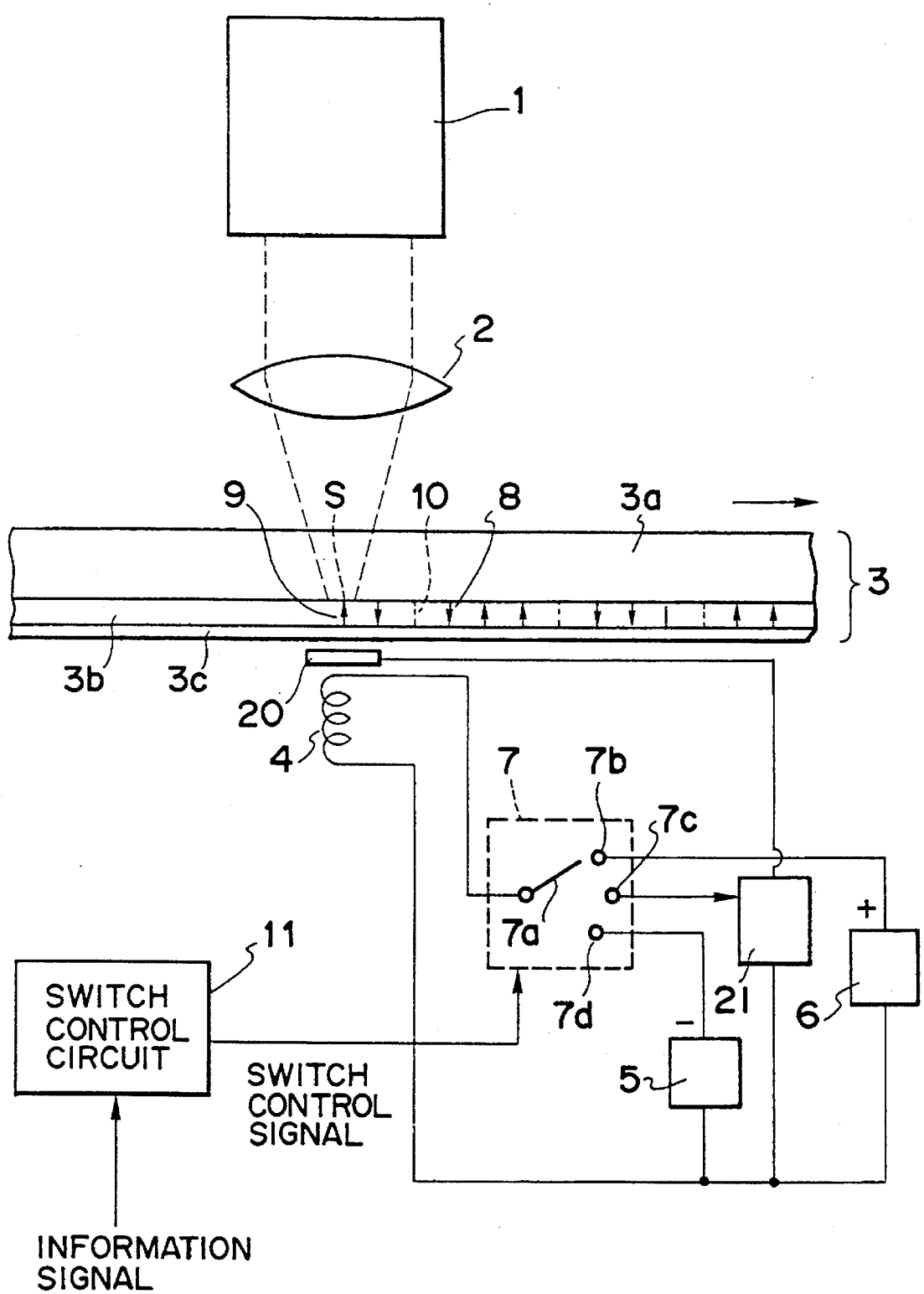
FIG. 3 is a view of a magneto-optical recording apparatus according to another embodiment of this invention.

In another embodiment as shown in FIG. 3, in order to prevent the strength of the magnetic field on a magneto-optical disk 3 from changing due to a disturbance (it is especially affected by the disturbance when the strength of the magnetic field is zero), a detection portion 20 for detecting magnetic field strength, for example, constructed of Hall elements, is placed near an electromagnetic coil 4. Values detected by the detection portion 20 for magnetic field strength are supplied to a power supply 21 of variable output. On the other hand, a fixed contact point 7c transmits a signal for indicating a non-magnetized state to the power supply 21 as described above. The power supply 21 outputs a controlled electric current, so that when the magnetic field strength detected by the detection portion 20 for detecting magnetic field strength was caused by the disturbance, the magnetic field with the same strength and the opposite polarity may be generated in the electromagnetic coil 4. Thus, the magnetic field strength is actively forced to be zero, whereby the influence caused by the disturbance can be eliminated and the three-value recording can be reliably and stably realized.

It should be noted that a magneto-optical record medium used in this invention is not different from a conventional one, but a magneto-optical record medium being TM-rich (Transition Metals sub-lattice magnetization rich) is preferred.

What is claimed:

1. A magneto-optical recording apparatus for forming a magnetic domain by applying onto a magneto-optical recording medium, having a single magnetic layer rich in transition metal sub-lattice magnetization, an external magnetic field whose strength is modulated by three-value record data, while applying a light beam having a predetermined strength with respect to a direction of a data track on the magneto-optical recording medium, said apparatus comprising:

a coil for generating the external magnetic field;

a three selection change over switch for changing over connections of a plurality of current supplies to said coil in order to change over the strength of the external magnetic field generated by said coil to three values of a positive predetermined value, zero and a negative predetermined value; and control means for receiving the three-value record data and for generating a control signal for selectively changing over the connections of said switch based on the received three-value record data, in order to form three kinds of magnetic domains on the recording medium corresponding to the three-value record data, wherein said switch changes over the connections of the current supplies to said coil based on the generated control signal.

2. A magneto-optical recording apparatus according to claim 1, wherein said magnetic field generation means comprises a magnetic field coil.

3. An apparatus according to claim 1, further comprising detection means for detecting the strength of the external magnetic field and for producing a detection result, and wherein said control means controls said magnetic field generation means on the basis of the detection result.

* * * * *

UNITED STATES PATENT AND TRADEMARK OFFICE
CERTIFICATE OF CORRECTION

PATENT NO. : 5,566,147
DATED : October 15, 1996
INVENTOR(S) : HIDEAKI SATO

It is certified that error appears in the above-indentified patent and that said Letters Patent is hereby corrected as shown below:

ON THE COVER PAGE:

Under "References Cited," Item [56]

"Omaii et al." should read --Omori et al.--.

IN THE DISCLOSURE:

COLUMN 2

Line 64, "angle-$\theta$" should read --angle $\theta$--.

COLUMN 3

Line 10, "Lased" should read --Laser--.
Line 24, "tile" should read --the--.
Line 25, "to" should be deleted.

UNITED STATES PATENT AND TRADEMARK OFFICE
CERTIFICATE OF CORRECTION

PATENT NO. : 5,566,147
DATED : October 15, 1996
INVENTOR(S) :
HIDEAKI SATO

It is certified that error appears in the above-indentified patent and that said Letters Patent is hereby corrected as shown below:

COLUMN 4

Line 25, "three selection change over" should read --three-selection change over--.

Signed and Sealed this

Eighth Day of April, 1997

Attest:

BRUCE LEHMAN

*Attesting Officer*   Commissioner of Patents and Trademarks